United States Patent
Klein

(10) Patent No.: US 11,466,808 B2
(45) Date of Patent: Oct. 11, 2022

(54) APPARATUS FOR HOLDING A CONTAINER ON AN UNEVEN SURFACE

(71) Applicant: David Klein, Kenosha, WI (US)

(72) Inventor: David Klein, Kenosha, WI (US)

( * ) Notice: Subject to any disclaimer, the term of this patent is extended or adjusted under 35 U.S.C. 154(b) by 0 days.

(21) Appl. No.: 17/166,834

(22) Filed: Feb. 3, 2021

(65) Prior Publication Data

US 2021/0239258 A1 Aug. 5, 2021

Related U.S. Application Data

(60) Provisional application No. 62/969,190, filed on Feb. 3, 2020.

(51) Int. Cl.
*F16M 11/00* (2006.01)
*F16M 11/20* (2006.01)

(52) U.S. Cl.
CPC ... *F16M 11/2021* (2013.01); *F16M 2200/021* (2013.01)

(58) Field of Classification Search
None
See application file for complete search history.

(56) References Cited

U.S. PATENT DOCUMENTS

| | | | | |
|---|---|---|---|---|
| 2,439,063 A | * | 4/1948 | Shur | E04H 12/32 248/536 |
| 2,683,277 A | * | 7/1954 | Bernaerts | B66F 13/00 16/18 R |
| 5,129,610 A | * | 7/1992 | Campbell | A61J 9/0684 248/106 |
| 5,217,193 A | * | 6/1993 | Drucker | B44D 3/14 248/148 |
| 5,303,890 A | * | 4/1994 | Carruth | A47C 20/026 248/118 |
| 6,533,227 B1 | | 3/2003 | Rom | |
| 6,776,379 B2 | * | 8/2004 | Sherer | B25H 3/02 248/150 |
| 8,287,181 B1 | * | 10/2012 | Melvin | E04D 15/00 366/348 |
| 2007/0102598 A1 | * | 5/2007 | Nichols | B25H 5/00 248/125.8 |

FOREIGN PATENT DOCUMENTS

GB 2281855 A * 3/1995 ............... E04G 3/26

* cited by examiner

*Primary Examiner* — Steven M Marsh
(74) *Attorney, Agent, or Firm* — Valauskas Corder LLC

(57) ABSTRACT

An apparatus for holding a container such as a bucket in a level position on an uneven surface, for example, a roof. The apparatus automatically levels itself using pivot points that permit the components of the apparatus to operate independently from each other. The components configured to rotate about pivot points so that a bucket can be held by the apparatus in an upright position.

13 Claims, 10 Drawing Sheets

APPARATUS FOR HOLDING A CONTAINER ON AN UNEVEN SURFACE

CROSS REFERENCE TO RELATED APPLICATIONS

This application claims priority to U.S. Provisional Patent Application 62/969,190 filed Feb. 3, 2020.

FIELD OF INVENTION

The invention generally relates to a holder for a container. More specifically, the invention relates to an apparatus for holding a bucket or other container in a level position on an uneven surface such as a roof.

BACKGROUND OF THE INVENTION

A container is any receptacle for holding a product and may be used in storage, packaging, and transportation. A bucket is a type of open container. Typically, buckets are made of metal or plastic and are used to hold and carry contents such as liquids or tools. A well-known bucket is a 5-gallon bucket.

A bucket is not stable when it is positioned on an uneven surface, for example, a bucket full of mortar, concrete or tools located on a pitched roof. It is important that a bucket be secure and stable in an upright position while positioned on one or more uneven surfaces. This prevents the contents of the bucket from spilling out or prevents the bucket from sliding off the surface, which may damage the surface or ground surface below, the bucket itself, or its contents.

Accordingly, there is a need for an apparatus that holds a container such as a bucket in a level position on an uneven surface. The present invention satisfies this need.

SUMMARY OF THE INVENTION

The present invention is directed to an apparatus that allows a container to remain stable on one or more uneven surfaces. The apparatus automatically levels itself when positioned on uneven surfaces. An uneven surface is any surface that is not level or smooth or a horizontal plane and may include sloped (incline or decline) surfaces, e.g., pitched roof. The apparatus is configured to hold a container in an upright position.

The apparatus according to the invention includes a platform component, support components and base components. The platform component includes an aperture element for receiving the container. A pair of support components are connected to the platform component. Each support component is configured to rotate with respect to the platform component. The apparatus also includes base components connected to the support components. Each base component is configured to rotate with respect to the support component.

An advantage of the invention is that the apparatus automatically levels itself when positioned on uneven surfaces. The apparatus automatically levels itself using pivot points that permit the components of the apparatus to operate independently from each other. The components move or rotate about the pivot points so that the platform component remains horizontal to keep the container in an upright position when the apparatus is on an uneven surface.

Another advantage is that the apparatus can be quickly transitioned from an "erect" state to a "broken-down" state where the apparatus is flattened. The pivot points permit the components to fold together so that the apparatus can be easily stored, packaged and transported. Additionally, in the "broken-down" state, a plurality of apparatuses may be stacked upon one another.

An advantage of the invention is that it can be positioned on a wide range of sloped surfaces, and further may be positioned on a surface that has two different degrees of slant. The apparatus does not require interchangeable components to adapt the apparatus to different sloped surfaces.

The apparatus is configured to disperse the weight of the container (with or without material) while stabilizing the platform component so that the apparatus does not overturn.

Another advantage of the invention is that the apparatus permits the platform component to tilt, allowing a user easier access to the container and its contents.

Yet another advantage is that the apparatus includes compartments, which may be used to hold or attach accessories, for example, tools, hardware, a user's beverage.

The apparatus is configured to be positioned on any material, including for example, concrete, wood, grass, as well as any roof material, e.g., asphalt shingles, terra cotta clay tiles, metal roof material.

The bucket apparatus is lightweight and may be fabricated from any material, for example, plastic, aluminum, wood, etc.

The invention may be used in a variety of applications, for example, roof repairs including masonry repairs, chimney repairs, tuckpointing, installation of poured concrete chimney crowns and rebuilds. Other applications may include painting of roof features such as dormers, eves, soffit and fascia, gutter cleaning, and carrying roofing tools and equipment, roofing paint and tar. It is contemplated that the bucket apparatus may also be used for painting on driveways that are pitched or to simply stabilize a bucket on any uneven surface.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention are shown in the attached drawings.

DETAILED DESCRIPTION OF THE INVENTION

The invention is directed to an apparatus for holding a bucket or other container in a level position on an uneven surface. The apparatus includes components configured to rotate so that a container can be held by the apparatus in an upright position.

Although the invention is shown and described with respect to a 5-gallon bucket, this is for exemplary purposes only. It is contemplated that the invention may work with any size container, e.g., 1, 3, 6 gallon container.

Figure 1:
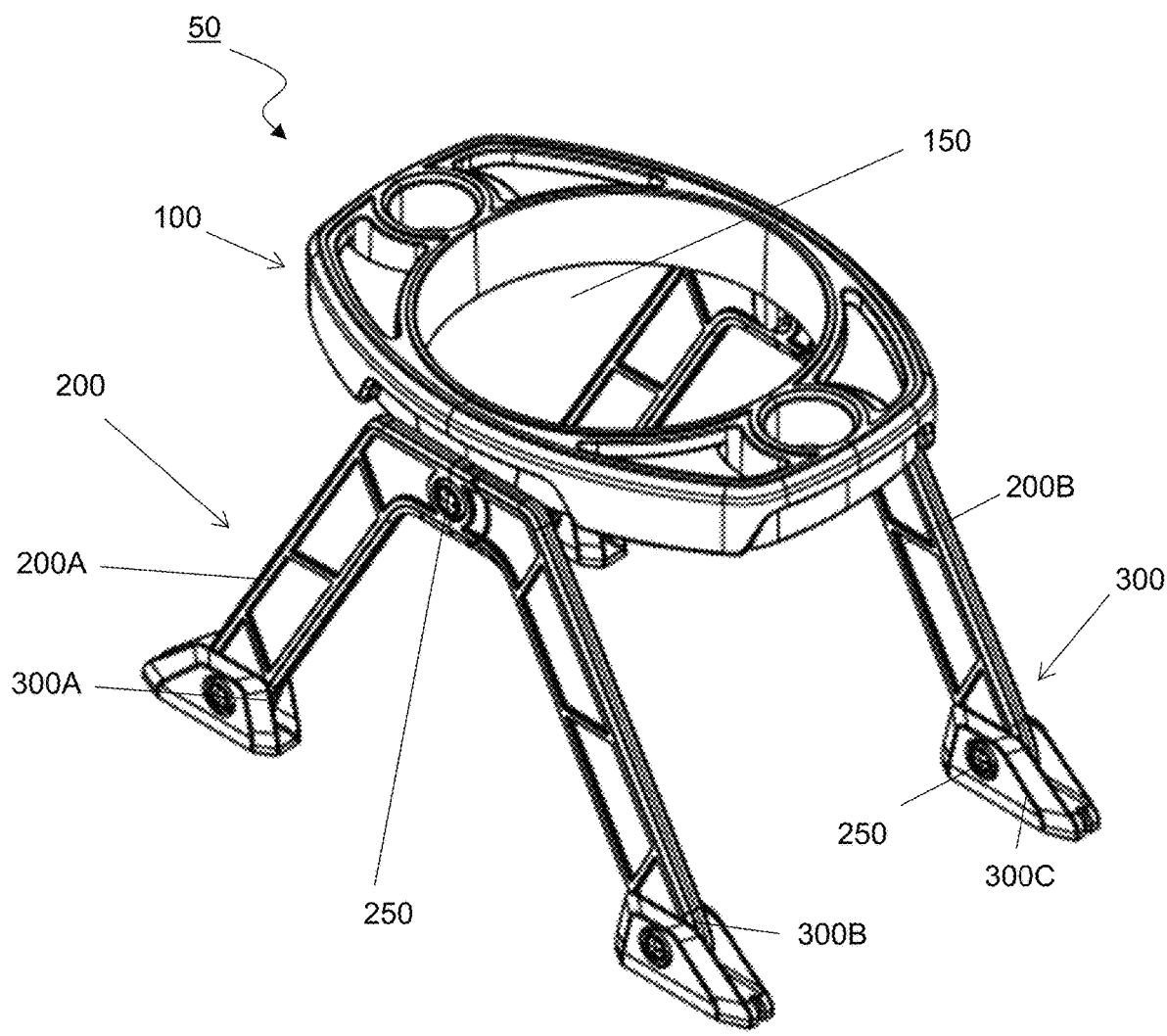
FIG. 1 illustrates a perspective view of an apparatus according to an embodiment of the invention.

FIG. 1 illustrates a perspective view of an apparatus 50 according to an embodiment of the invention. The apparatus 50 according to the invention includes a platform component 100, support components 200 and base components 300. The platform component 100 includes an aperture element 150 for receiving the container. A pair of support components 200 are connected to the platform component 100. Each support component 200 is configured to rotate with respect to the platform component 100. The apparatus 50 also includes base components 300 connected to the support components 200. Each base component 300 is configured to rotate with respect to the support component 200.

The apparatus 50 includes pivot elements 250 that permit the components 100, 200, 300 to move independently from one another. The components 100, 200, 300 move or rotate about the pivot elements 250 so that the platform component 100 remains horizontal to keep the container in an upright position when the apparatus 50 is on an uneven surface.

Figure 2:
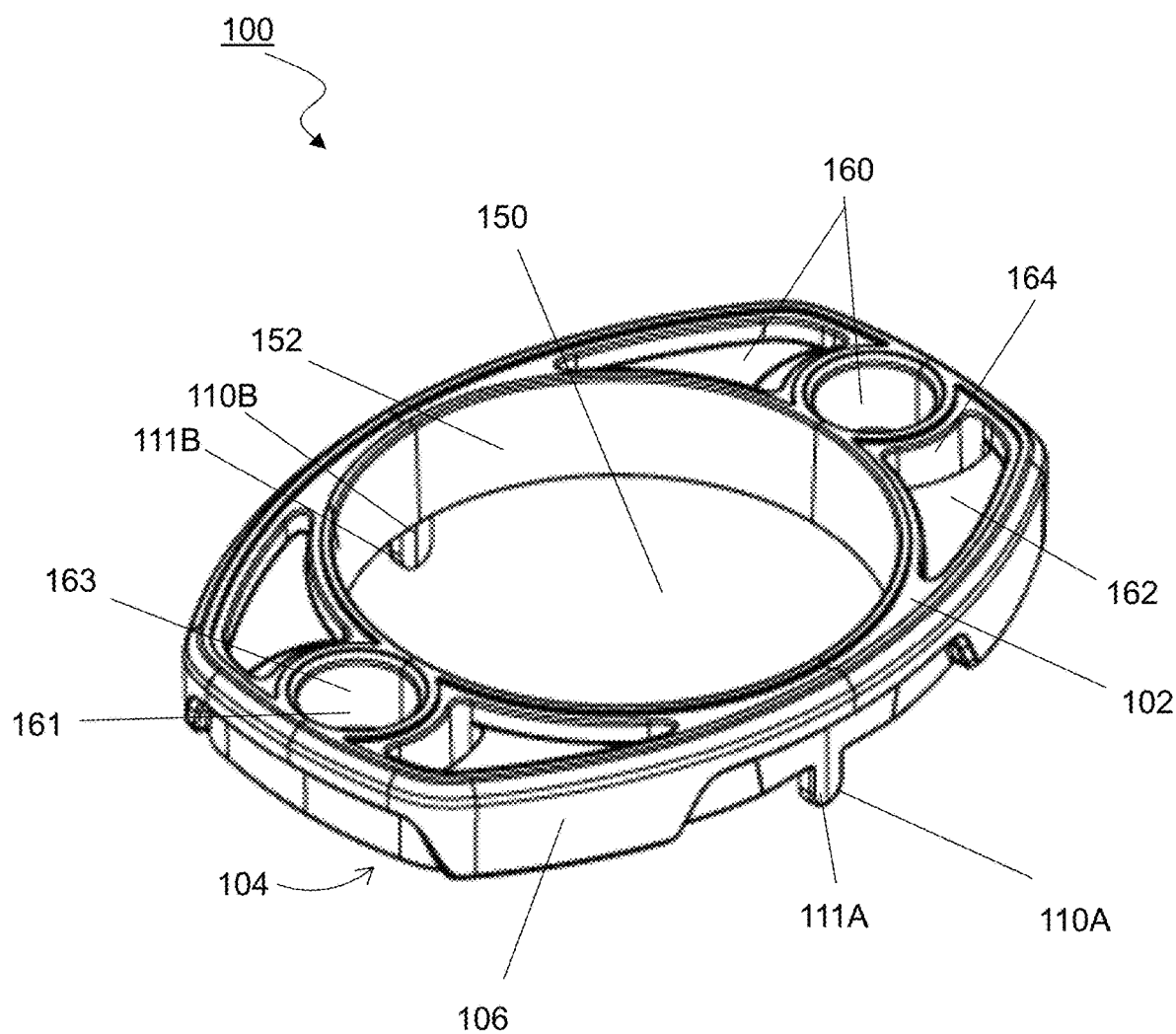
FIG. 2 illustrates a platform component of the apparatus.

FIG. 2 illustrates a platform component 100 of the apparatus 50. The platform component 100 includes a top surface 102 and a bottom surface 104 connected by a side surface 106. An aperture element 150 is located in the platform component 100 and defined by a boundary surface 152. The boundary surface 152 defines the size and shape of the of the aperture element 150. The diameter of the aperture element 150 is sized to retain a desired container.

The platform component 100 may further include one or more compartment elements 160. Compartment elements 160 are configured to receive and hold items, for example, tools like a hammer, scissors, flat bar, paint brushes, or a caulk gun. The one or more compartment elements 160 may be further configured to hold items such as nails, screws, and beverage containers. As shown in FIG. 2, a first compartment element 161 is defined by a first border surface 163 and is configured to hold a beverage container. A second compartment element 162 is defined by a second border surface 164 and may be configured to hang items, such as the "claw" portion of a hammer.

The platform component 100 includes connection areas 110 configured for attaching the platform component 100 and the support components 200. According to one embodiment of the invention, a first connection area 110A and a second connection area 100B are diametrically opposed— approximately 180 degrees—on the side surface 106. Connection area 110A comprises a first spindle element 111A and connection area 110B comprises a second spindle element 111B.

According to one embodiment of the invention, the apparatus includes two support components 200A, 200B. The features of the first support component 200A, now described, are identical to the features of the second support component 200B.

Figure 3A:
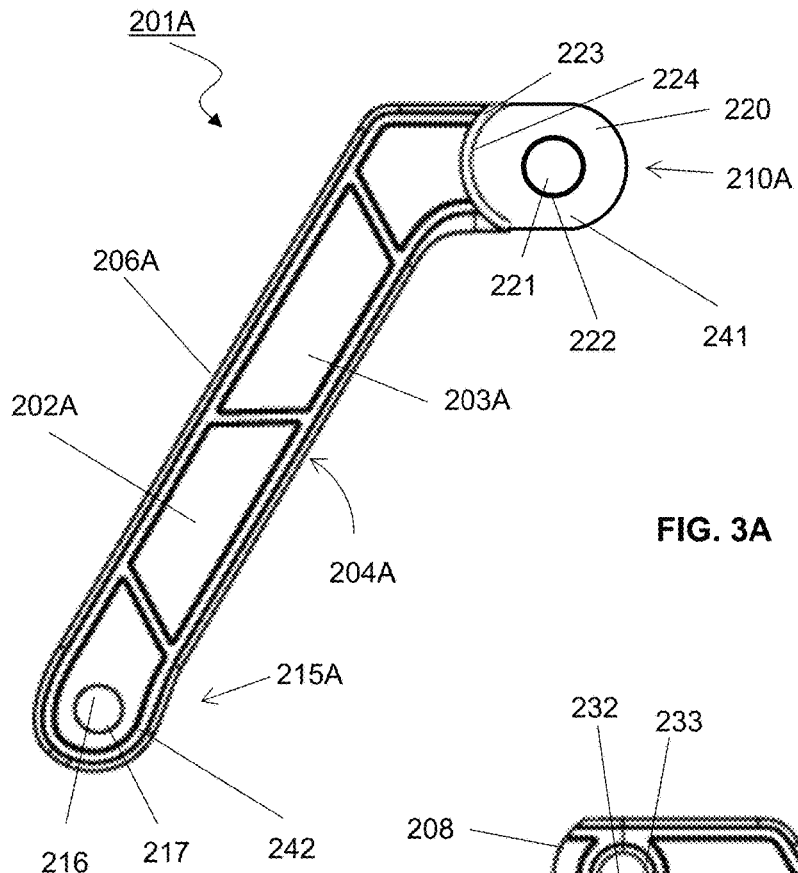
FIG. 3A illustrates a portion of the support component of the apparatus.
Figure 3B:
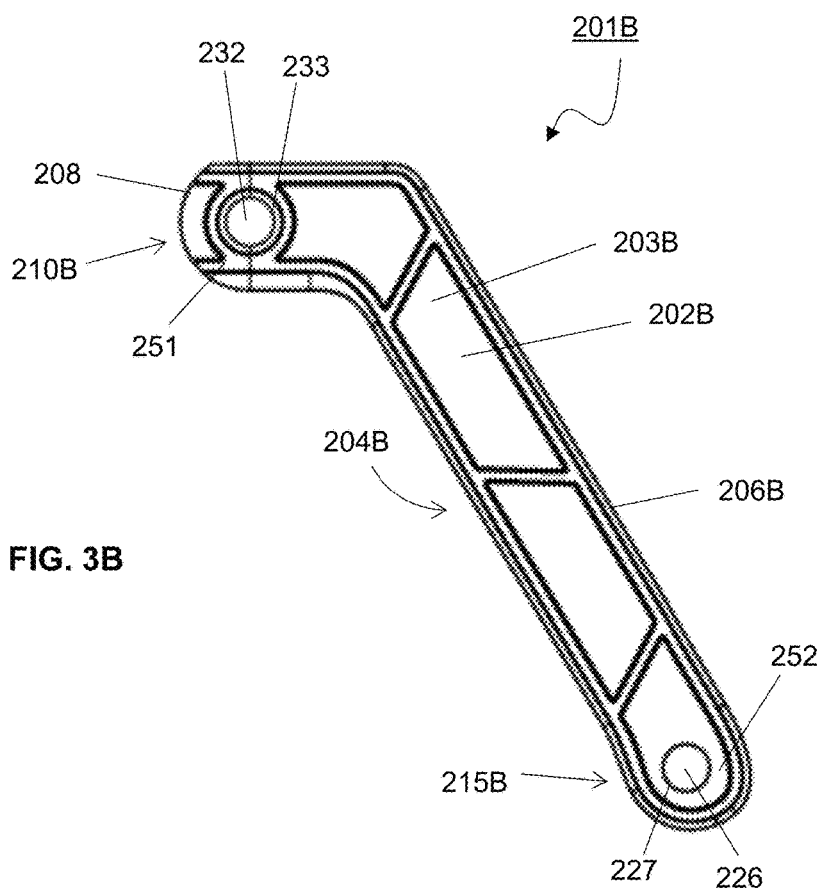
FIG. 3B illustrates another portion of the support component of the apparatus.

A first support component 200A comprises two leg portions 201A, 201B. FIG. 3A illustrates a first leg portion 201A of the first support component 200A of the apparatus 50. FIG. 3B illustrates a second leg portion 201B of the first support component 200A of the apparatus 50.

As shown in FIG. 3A, the first leg portion 201A is defined by a first body element 203A with a first front surface 202A, a first rear surface 204A, and a first edge surface 206A. The first body element 203A extends from a first end 241 to a second end 242. A first attachment area 210A is located at the first end 241 and comprises a first base portion 220 including a first aperture 221 defined by a first border surface 222. The first attachment area 210A further comprises a first wall element 223 that projects perpendicular from the first base portion 220. The first wall element 223 shown in FIG. 3A includes a first curved inside surface 224. The second attachment area 215A comprises a first opening 216 defined by first boundary surface 217.

As shown in FIG. 3B, the second leg portion 201B is defined by a second body element 203B with a second front surface 202B, a second rear surface 204B, and a second edge surface 206B. The second body element 203B extends from a first end 251 to a second end 252. A third attachment area 210B is located at the first end 251 and comprises a second aperture 232 defined by a second border surface 233. The second edge surface 206B comprises a second curved surface portion 208 at the third attachment area 210B. The fourth attachment area 215B further comprises a second opening 226 defined by second boundary surface 227.

From a first attachment area 210A, the first leg portion 201A extends at an angle to a second attachment area 215A. The second leg portion 201B extends at an angle from a third attachment area 210B to a fourth attachment area 215B. The angled leg portions 201A, 201B provide greater stability over straight leg portions by distributing the load of apparatus 50. Any angle to stabilize the platform component is contemplated.

Figure 3C:
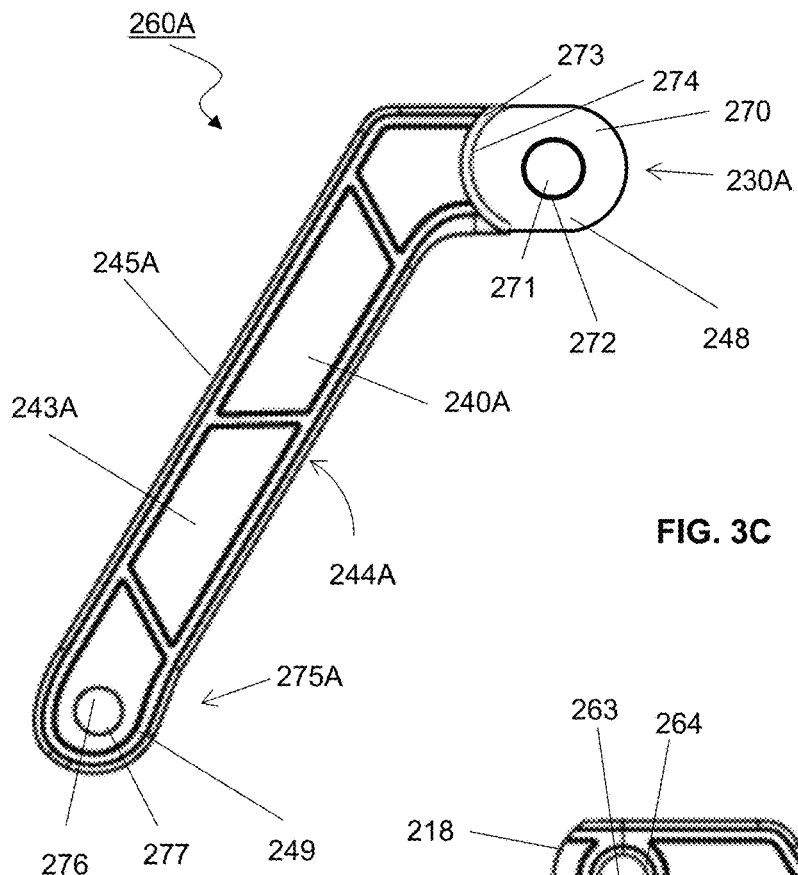
FIG. 3C illustrates another portion of the support component of the apparatus.
Figure 3D:
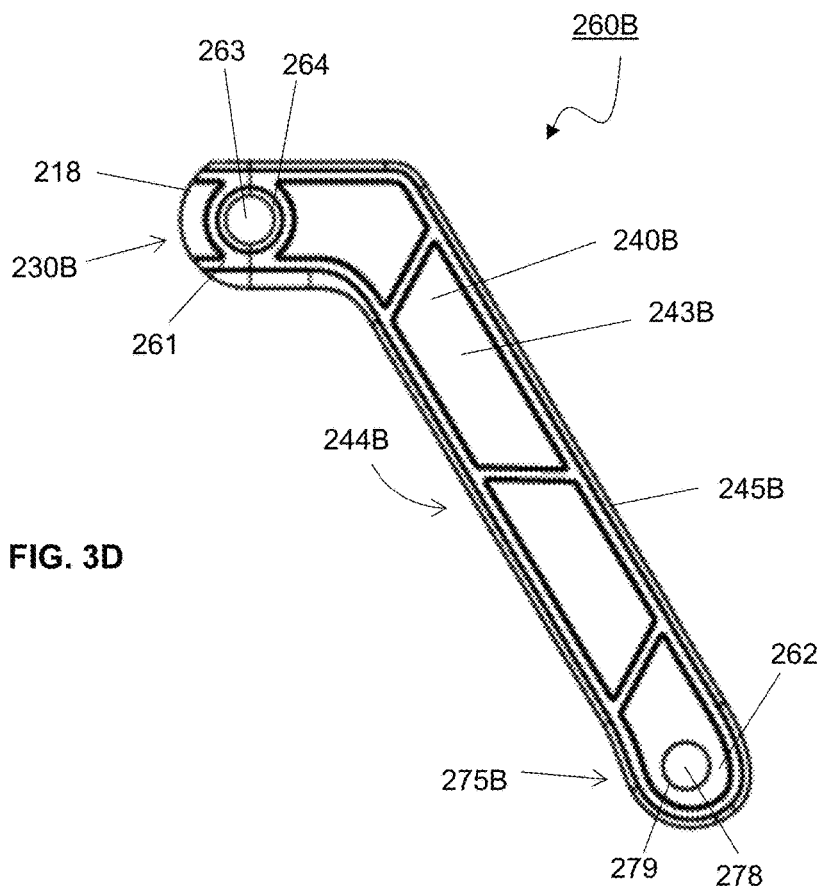
FIG. 3D illustrates another portion of the support component of the apparatus.

A second support component 200B comprises two leg portions 260A, 260B. FIG. 3C illustrates a third leg portion 260A of the second support component 200B of the apparatus 50. FIG. 3D illustrates a fourth leg portion 260B of the second support component 200B of the apparatus 50.

As shown in FIG. 3C, the third leg portion 260A is defined by a third body element 240A with a third front surface 243A, a third rear surface 244A, and a third edge surface 245A. The body element 243A extends from a first end 248 to a second end 249. A fifth attachment area 230A is located at the first end 248 and comprises a second base portion 270 including a third aperture 271 defined by a third border surface 272. The fifth attachment area 230A further comprises a second wall element 273 that projects perpendicular from the second base portion 270. The second wall element 273 shown in FIG. 3C includes a third curved inside surface 274. The sixth attachment area 275A comprises a third opening 276 defined by third boundary surface 277.

As shown in FIG. 3D, the fourth leg portion 260B is defined by a fourth body element 240B with a fourth front surface 243B, a fourth rear surface 244B, and a fourth edge surface 245B. The fourth body element 240B extends from a first end 261 to a second end 262. A seventh attachment area 230B is located at the first end 261 and comprises a fourth aperture 263 defined by a fourth border surface 264. The fourth edge surface 245B comprises a curved surface portion 218 at the seventh attachment area 230B. The eighth attachment area 275B further comprises a fourth opening 278 defined by fourth boundary surface 279.

From a fifth attachment area 230A, the third leg portion 260A extends at an angle to a sixth attachment area 275A. The fourth leg portion 260B extends at an angle from a seventh attachment area 230B to an eighth attachment area 275B. The angled leg portions 260A, 260B provide greater stability over straight leg portions by distributing the load of apparatus 50. Any angle to stabilize the platform component is contemplated.

Figure 4:
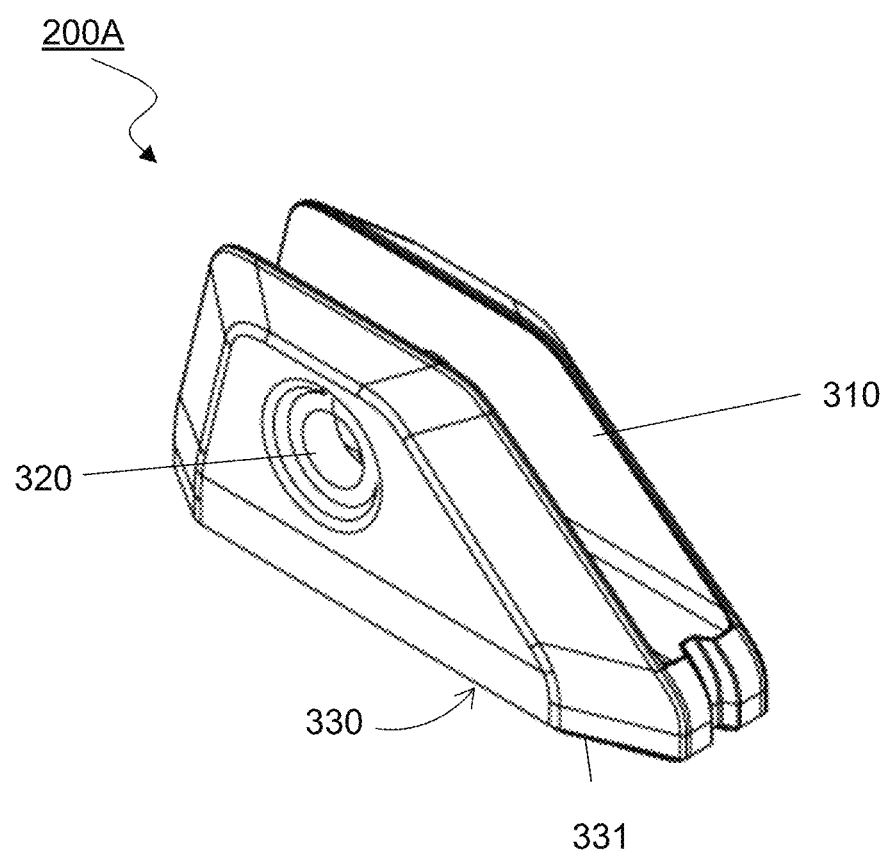
FIG. 4 illustrates a base component of the apparatus.

FIG. 4 illustrates a base component 300 of the apparatus 50. Each base component 300 includes a body element 310 with a base surface 330. The base component 300 further includes a fastening area 320. The base component 300 is configured to rotate and so that a majority of the base surface 330 contacts the uneven surface. Each base component 300 may further include a textured element 331 such as a rubber pad so that the base component 300 holds tightly to, or grips, the uneven surface. It is also contemplated that the textured element 331 may be removable, for example, to be replaced when it experiences wear and tear.

Figure 5:
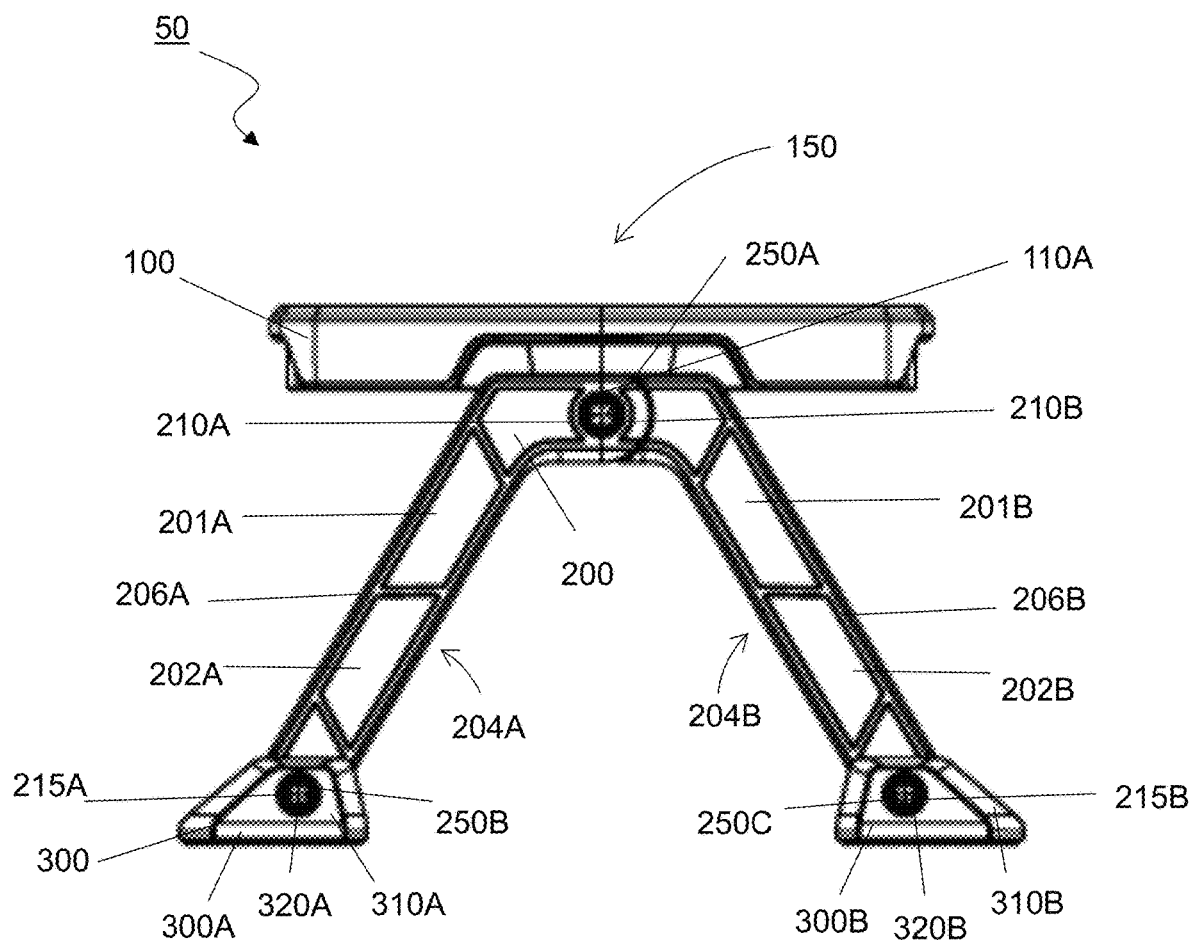
FIG. 5 illustrates a side view of the apparatus.
Figure 6:
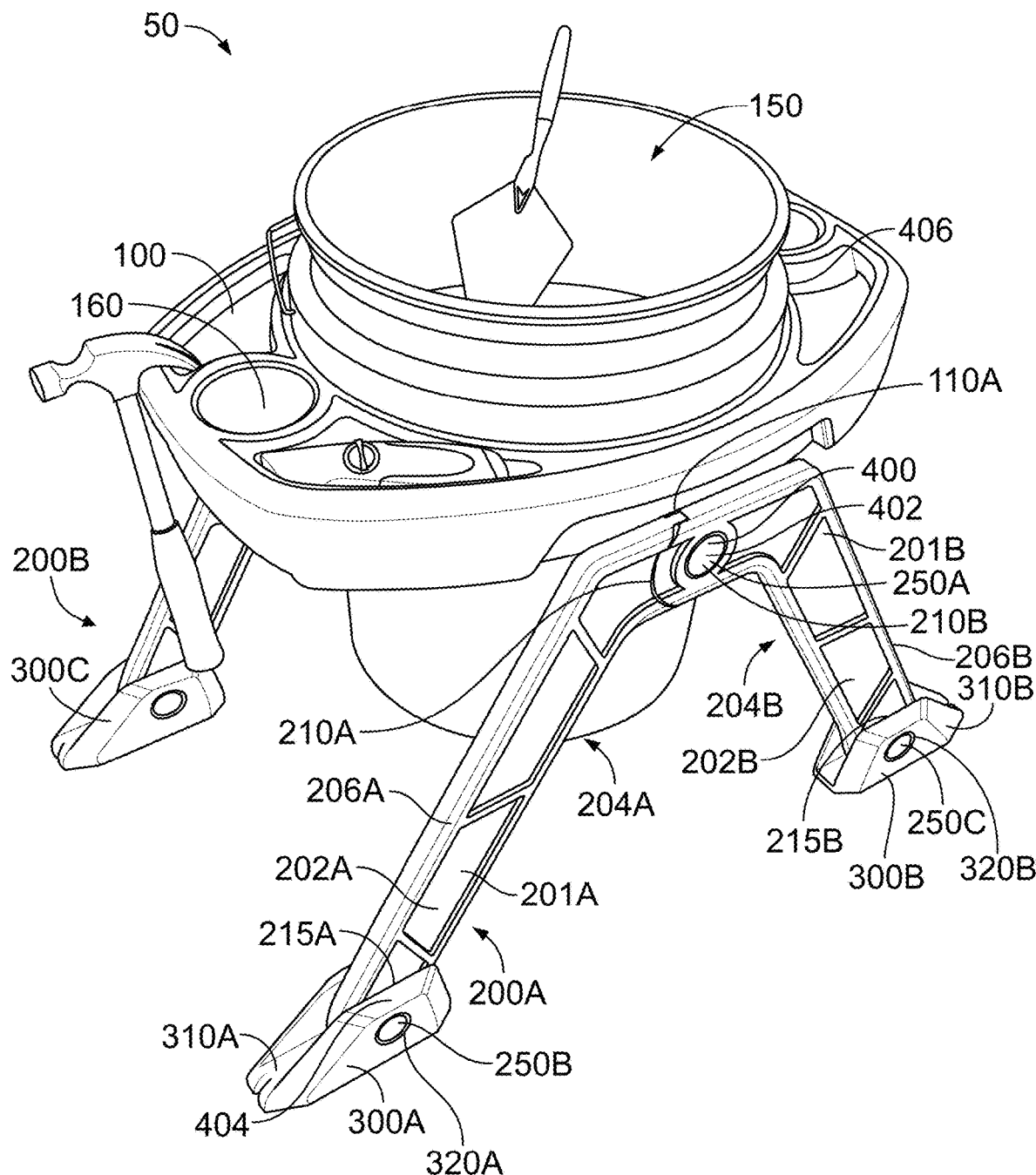
FIG. 6 illustrates a perspective view of the apparatus including bucket.

FIG. 5 illustrates a side view of the apparatus 50 and FIG. 6 illustrates a perspective view with a container installed. A pair of support components 200 are connected to each side of the platform component 100 and base components 300 are connected to each support component 200.

Assembly of the apparatus 50 is discussed below with respect to one side noting that the same applies to the other side.

A support component 200 is attached to the platform component 100. Specifically, first attachment areas 210A, 210B of the support component 200 are attached to the connection area 110A of the platform component 100 creating a pivot element 250A around which the support component 200 rotates.

The first leg portion 200A extends at an angle from the first attachment area 210A to a second attachment area 215A. A base component 300A is attached to the leg portion 200A. Specifically, fastening area 320A of the base component 300A is attached to the second attachment area 215A of the first leg portion 200A creating a pivot element 250B around which the base component 300A rotates.

Like the first leg portion 200A, second leg portion 200B extends at an angle from the first attachment area 210B to a second attachment area 215B. A base component 300B is attached to the second attachment area 215B of the second leg portion 200B creating a pivot element 250C around which the base component 300B rotates.

Base elements 300A, 300B are attached to the apparatus 50 so that the body elements 310A, 310B are each positioned on both the front and rear sides 202A, 204A and 202B, 204B of the leg portions 200A, 200B. This helps to balance the apparatus 50 so that it does not overturn.

The apparatus 50 may further include locking components 400. A first locking component 402 may be configured to prevent movement between the platform component 100 and one of the support components 200. A second locking component 404 may be configured to prevent movement between one or more of the base components 300 and the support component 200. A third locking component 406 is contemplated to secure the container in the aperture element 150. As an example, the container may be twisted in the aperture element 150 so that a rim of the container engages with a channel on the boundary surface 152 of the aperture element 150.

As shown in FIG. 6, the platform component 100 includes compartment elements 160 configured to receive and hold items.

Figure 7:
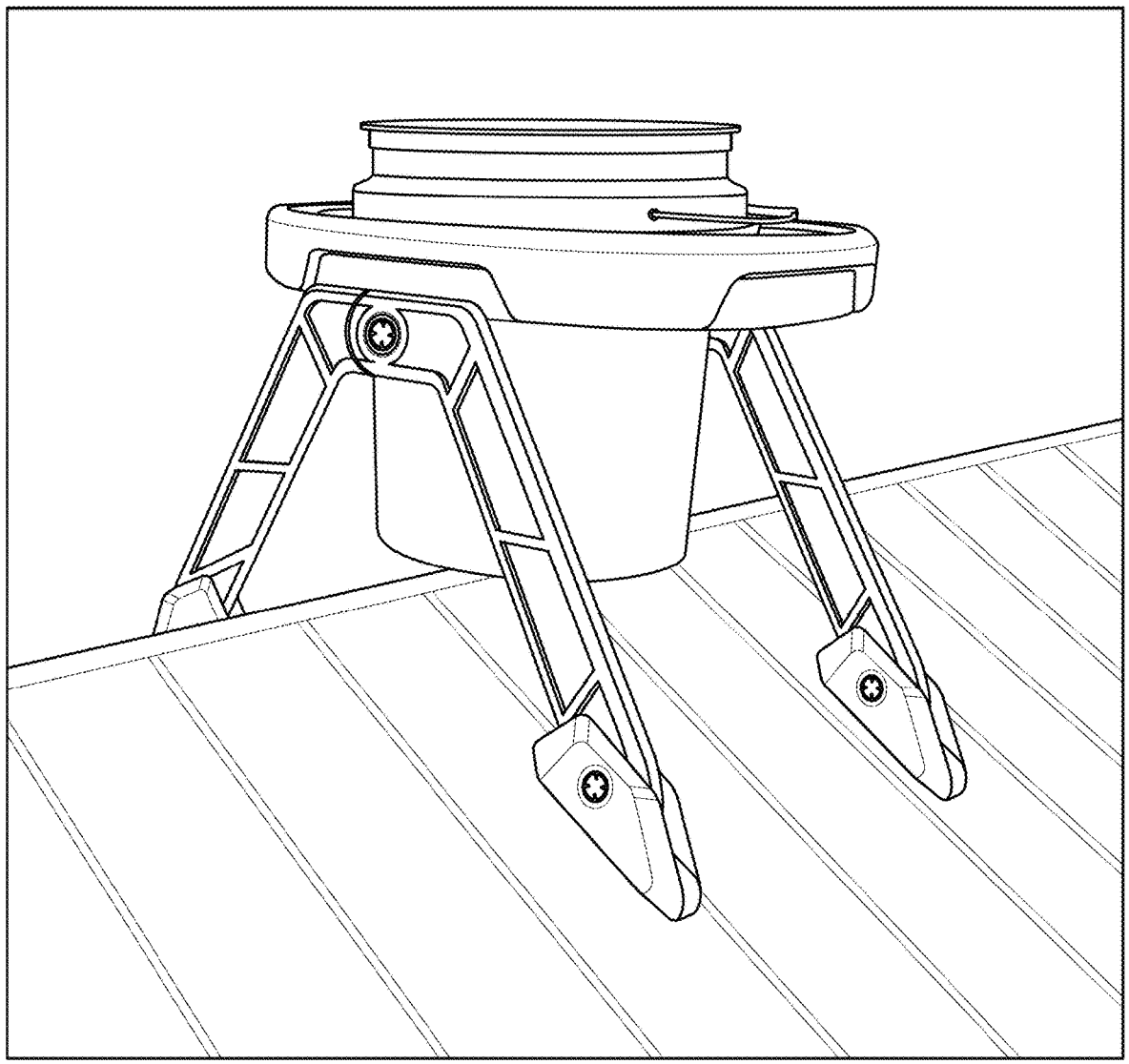
FIG. 7 illustrates the apparatus on two different uneven surfaces (i.e., pitched roof).
Figure 8:
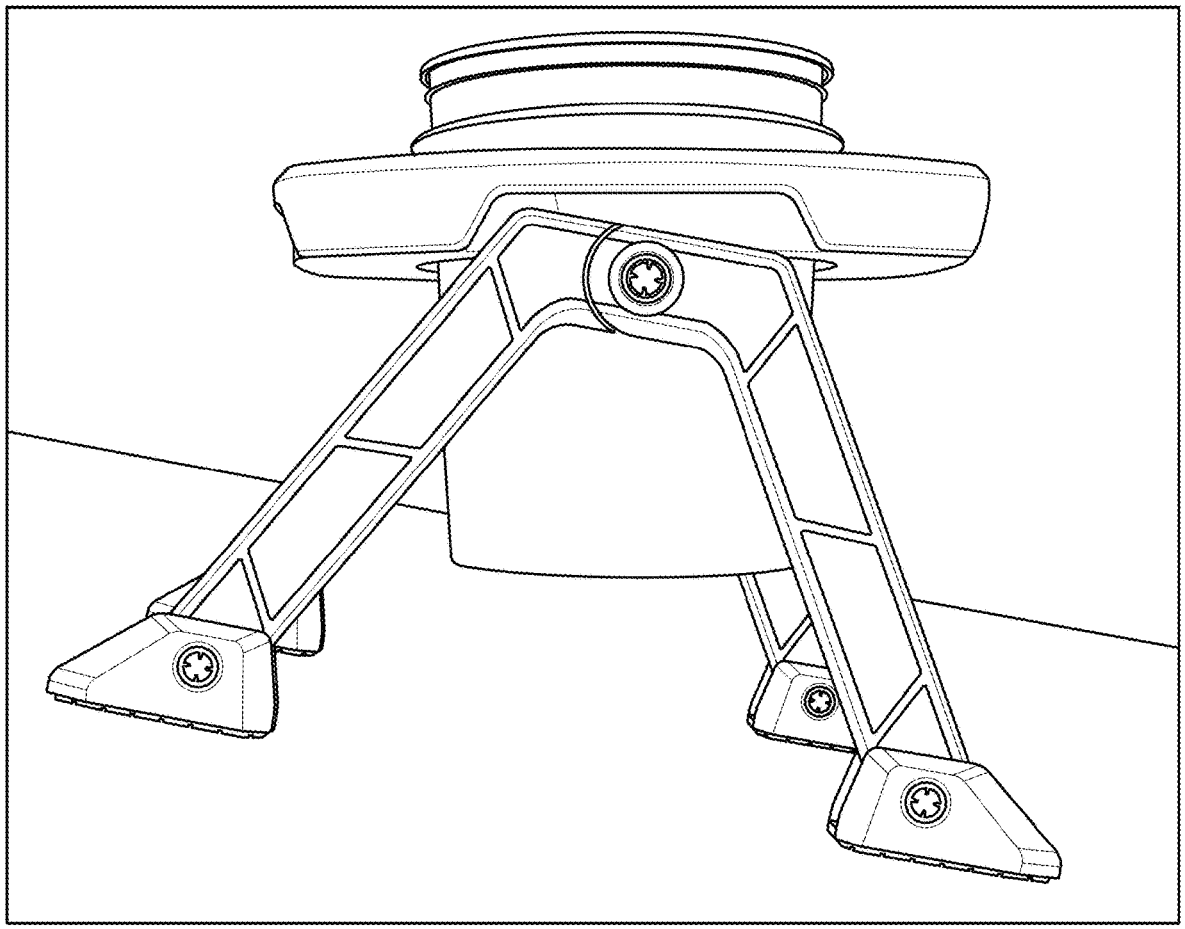
FIG. 8 illustrates the apparatus on one uneven surface.

FIG. 7 illustrates the apparatus on two different uneven surfaces (i.e., pitched roof) and FIG. 8 illustrates the apparatus on one uneven surface. The apparatus 50 includes two support components each with three pivot elements 250A, 250B, 250C allowing the support components 200 and base components 300 to move independently from each another. When positioned on an uneven surface, the base components 300 rotate so that a majority of the bottom surface 330 of each base component 300 rests on the uneven surface. Simultaneously, each support component 200 rotates so that the platform component 100 remains horizontal to keep the bucket in an upright position.

It is also contemplated that the platform component 100 can be tilted using pivot elements 250A on both support components 200 of the apparatus 50. Tilting the platform component allows a user easier access to the contents in the container.

Figure 9:
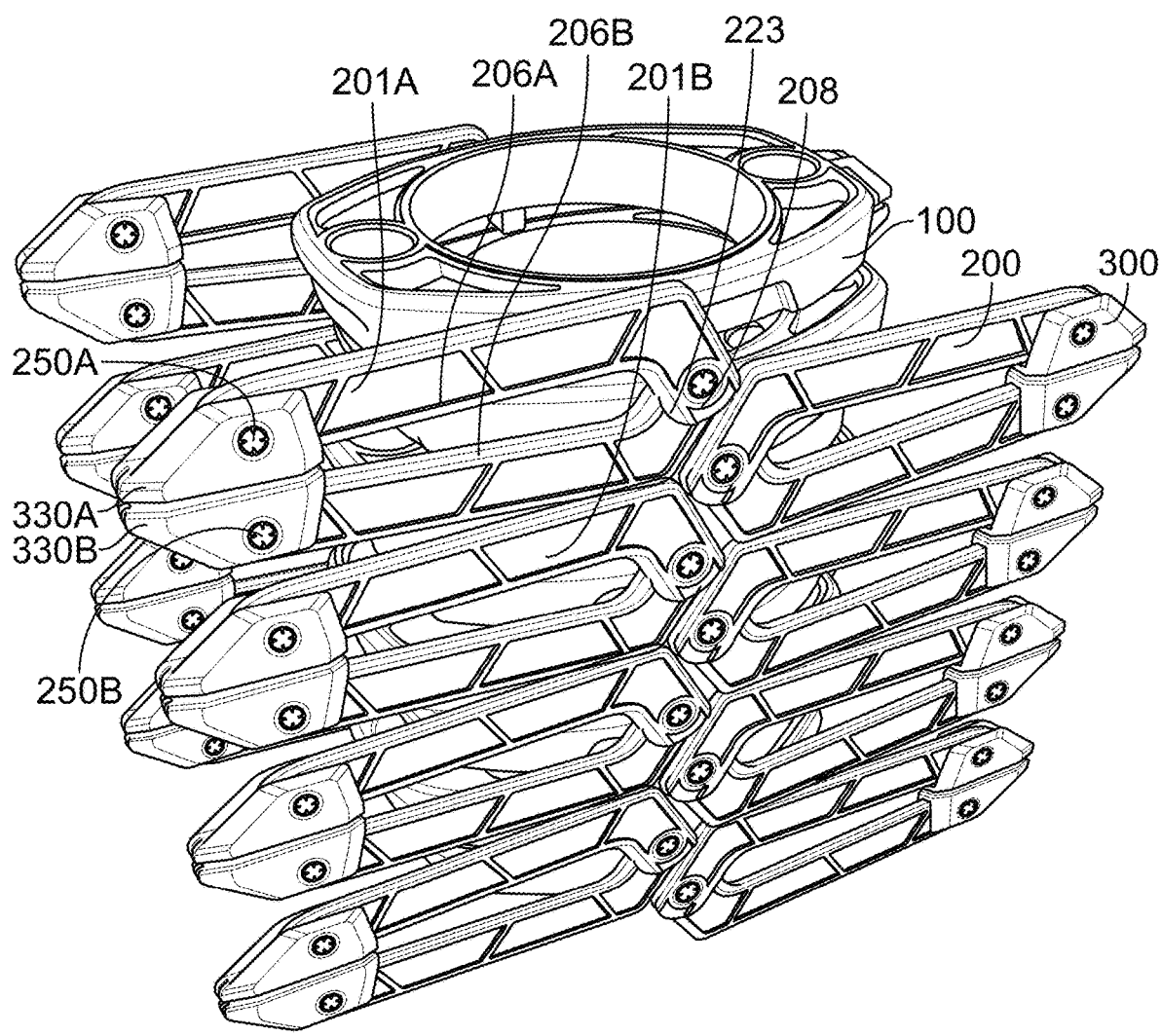
FIG. 9 illustrates a plurality of apparatuses in a "broken down" state and in a stacked configuration.

FIG. 9 illustrates a plurality of apparatuses in a "broken down" state and in a stacked configuration. The apparatus is quickly transitioned from an "erect" state to a "broken-down" state, or flattened, where the components of the apparatus are folded together. The pivot elements permit the components to fold together so that the apparatus to be easily stored, packaged and transported.

Specifically, in the "broken-down" state, the support component 200 rotates about pivot element 250A in two ways. First, the leg portions 200A, 200B can collapse by rotating each leg portion toward each other so that the edge surfaces 206A, 206B move toward each other, or closer together. Also, the folded leg portions 200A, 200B can together be rotated about pivot element 250A to be positioned horizontal, or parallel, with the platform component 100. In addition, the base components 300 rotate about pivot elements 250B, 250C so that the bottom surface 330A, 330B of each base component 300 are parallel and nearly touching each other. In this "broken-down" state, the apparatus is flattened so that a plurality of apparatuses may be stacked upon one another as shown in FIG. 9.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. An apparatus for holding a container in a level condition on an uneven surface, the apparatus comprising:
  a platform component including a top surface, a bottom surface and a side surface, a first spindle element and a second spindle element each located on the side surface, wherein the first spindle element is diametrically opposed to the second spindle element, the platform further comprising an aperture element located through both the top surface and the bottom surface of the platform component, the aperture element configured to receive the container;
  a pair of support components, a first support component connected to the first spindle element and a second support component connected to the second spindle element, wherein the first support component is configured to rotate about the first spindle element and the second support component is configured to rotate about the second spindle element, the first support component divided into a first leg portion and a second leg portion, wherein the first lea portion and the second leg portion are each rotatable about the first spindle element such that the first leg portion and second leg portion are configured to move towards each other in a folded position, the second support component divided into a third leg portion and a fourth leg portion, wherein the third leg portion and the fourth leg portion are each rotatable about the second spindle element such that the third leg portion and the fourth leg portion are configured to move towards each other in a folded position, and a plurality of base components, each base component connected to the first leg portion, the second leg portion, the third leg portion, and the fourth leg portion, and each base component configured to rotate.

2. The apparatus according to claim 1, wherein the aperture element is centrally located in the platform component.

3. The apparatus according to claim 1 further comprising a first locking component configured to prevent movement between the platform component and one of the support components.

4. The apparatus according to claim 1 further comprising a second locking component configured to prevent movement between one of the base components and one of the support components.

5. The apparatus according to claim 1, wherein the platform component includes one or more compartment elements.

6. The apparatus according to claim 1, wherein each base component includes a textured element.

7. The apparatus according to claim 6, wherein the textured element is a rubber pad.

8. The apparatus according to claim 1, wherein the first leg portion of the first support component defined by a first body element with a first front surface, a first rear surface, and a first edge surface, the first body element extending from a first end to a second end, a first attachment area located at the first end and a second attachment area located at the second end, the first attachment area comprising a first base portion including a first aperture defined by a first border surface, the first attachment area further comprising a first wall element with a first curved surface, the first wall element projects perpendicular from the first base portion, the second attachment area comprising a first opening defined by a first boundary surface.

9. The apparatus according to claim 8, wherein the second leg portion of the first support component defined by a second body element with a second front surface, a second rear surface, and a second edge surface, the second body element extending from a first end to a second end, a third attachment area located at the first end and a fourth attachment area located at the second end, the third attachment area comprising a second aperture defined by a second border surface and including a second curved surface portion of the second edge surface, the fourth attachment area further comprising a second opening defined by a second boundary surface.

10. The apparatus according to claim 1, wherein the third leg portion of the second support component defined by a third body element with a third front surface, a third rear surface, and a third edge surface, the third body element extending from a first end to a second end, a fifth attachment area located at the first end and a sixth attachment area located at the second end, the fifth attachment area comprising a second base portion including a third aperture defined by a third border surface, the fifth attachment area further comprising a second wall element with a third curved surface, the second wall element projects perpendicular from the second base portion, the sixth attachment area comprising a third opening defined by a third boundary surface.

11. The apparatus according to claim 10, wherein the fourth leg portion of the second support component defined by a fourth body element with a fourth front surface, a fourth rear surface, and a fourth edge surface, the fourth body element extending from a first end to a second end, a seventh attachment area located at the first end and an eighth attachment area located at the second send, the seventh attachment area comprising a fourth aperture defined by a fourth border surface and including a fourth curved surface portion of the fourth edge surface, the eighth attachment area further comprising a fourth opening defined by a second edge surface.

12. The apparatus according to claim 9, wherein the second curved surface portion of the second edge surface moves within the first curved surface of the first wall element.

13. The apparatus according to claim 11, wherein the fourth curved surface portion of the fourth edge surface moves within the third curved surface of the second wall element.

* * * * *